United States Patent
Roodt

(10) Patent No.: US 6,789,289 B2
(45) Date of Patent: Sep. 14, 2004

(54) WINDSCREEN WIPER COMPRISING A WIPER ARM

(75) Inventor: Inigo Op't Roodt, Hasselt (BE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/469,406

(22) PCT Filed: Dec. 18, 2002

(86) PCT No.: PCT/DE02/04654

§ 371 (c)(1),
(2), (4) Date: Aug. 28, 2003

(87) PCT Pub. No.: WO03/051696

PCT Pub. Date: Jun. 26, 2003

(65) Prior Publication Data

US 2004/0093681 A1 May 20, 2004

(30) Foreign Application Priority Data

Dec. 19, 2001 (DE) .......................................... 101 62 399

(51) Int. Cl.[7] .................................................. B60S 1/40
(52) U.S. Cl. .............................. 15/250.32; 15/250.351; 15/250.44
(58) Field of Search .......................... 15/250.32, 250.44, 15/250.351, 250.361, 250.43, 250.31

(56) References Cited

U.S. PATENT DOCUMENTS

| | | | |
|---|---|---|---|
| 2,974,341 A | * 3/1961 | Hart | 15/250.32 |
| 4,132,490 A | * 1/1979 | Journee | 403/316 |
| 4,300,259 A | * 11/1981 | Maiocco | 15/250.32 |
| 4,649,591 A | 3/1987 | Guerard | |
| 5,435,041 A | 7/1995 | Ho | |
| 6,553,607 B1 | * 4/2003 | De Block | 15/250.32 |
| 6,611,988 B1 | * 9/2003 | De Block | 15/250.32 |

FOREIGN PATENT DOCUMENTS

| | | |
|---|---|---|
| DE | 199 24 662 A | 11/2000 |
| EP | 0 053 960 A | 6/1982 |
| GB | 1 599 534 A | 10/1981 |

* cited by examiner

*Primary Examiner*—Gary K. Graham
(74) *Attorney, Agent, or Firm*—Michael Best & Friedrich LLP

(57) ABSTRACT

The invention starts with a windshield wiper with a wiper arm (10) on whose free end a pin (22) is fastened laterally, transverse to the longitudinal direction (64) and pointing to a wiper blade (24) for the articulated connection of the wiper blade (24), which pin is inserted into a passage opening of the wiper blade (24) and in an assembled position is locked axially via a bridge (12) that is arranged parallel to the pin (22) on the wiper arm (10) and grips over the wiper blade (24) with a bent end (14). It is proposed that the wiper blade (24) feature a supporting bracket system with a center bracket (26) that has an inset box (28), whose side walls (30) are connected to one another via an articulated bolt (32) and always feature at least one passage (34) offset in the longitudinal direction (64) to the articulated bolt (32), that a plastic adapter (38) with a block-shaped center part (54) be inserted from above into the inset box (28), which center part is adjacent with lateral guide surfaces (56) to the insides of the side walls (30) and from whose covering wall (40) collars (42) project laterally beyond the side walls (30) forming guide surfaces (44) in the area of the bridge (12) to which a bearing surface (20) of the wiper arm (10) and the bent end (14) of the bridge (12) are adjacent in an assembled state, and that the collars (42) form bearing eyes (46) in the area of at least two opposing passages (34), which bearing eyes are arranged externally on the inset box (28) and are separated by slots (48) from the center part (54), which features a rest bore hole (50) matching the bearing eyes (46), whereby in an assembled state the adapter (38) is held on the articulated bolt (32) via a clip (58) in the center part (54) by means of locking noses (60).

4 Claims, 2 Drawing Sheets

WINDSCREEN WIPER COMPRISING A WIPER ARM

BACKGROUND OF THE INVENTION

The invention starts with a windshield wiper with a wiper arm in accordance with the pre-characterizing clause of claim 1.

Known windshield wipers feature a wiper arm, which sits on a wiper shaft. This shaft is driven by a wiper motor. A wiper blade is connected in an articulated manner to the free end of the wiper arm. As a rule, the wiper blade has a multi-unit supporting bracket system with a central bracket. Linked to this are subordinate brackets, of which at least several, having claws on their ends, hold a wiper strip. Inarticulate wiper blades are also known, which, instead of the supporting bracket system, have a resilient elastic supporting element that is fabricated of plastic perpendicular to the windshield. In order to improve the spring property it can feature at least one spring rail made of spring steel. In an unloaded state, the supporting element has a greater curvature than the vehicle window so that the wiper strip is applied to the vehicle window with appropriate pressure distribution under the application force by the wiper arm.

Inarticulate wiper blades are low-slung, something that is very favorable with regard to its behavior in terms of flow technology and noise development in the air stream wind. A windshield wiper with an inarticulate wiper blade, which is linked to a wiper arm via a so-called "sidelock system," is known from DE 199 24 662 A1. For this purpose, a pin on the free end of the wiper arm, which features a U-shaped profile that is open towards the vehicle window, is riveted laterally, transverse to its longitudinal direction and pointing towards the wiper blade. The pin is pivoted in a rest bore hole of a connecting part, which is permanently connected to the supporting element of the wiper blade.

A bridge is arranged parallel to the pin on the wiper arm offset in the longitudinal direction and the bridge is bent at its free end towards the side of the pin. In an assembly position, in which the wiper blade is held transverse to the longitudinal direction of the wiper arm, the pin can be put into the rest bore hole of the connecting part. If the wiper blade is subsequently rotated in the longitudinal direction of the wiper arm, the bridge grips over the wiper blade and locks it with its bent end so that in an assembled state the wiper blade is guided onto the pin between the bent end of the bridge and the wiper arm. In the wiper blade's operating position, the bridge dips into a corresponding groove of the connecting part and ends approximately flush with the upper side of the connecting part. For disassembly the wiper blade must be swiveled in the opposite direction until the bent end disengages and the wiper blade can be pulled from the pin.

Another sidelock system with a cylindrical adapter, which is used to compensate for different pin diameters, is known from U.S. Pat. No. 4,980,944 A1. The adapter has a rest bore hole, which is arranged eccentric to the outer contour of the adapter. In this arrangement, the eccentricity is selected in such a way that a continuous longitudinal slot is formed in the area of the circumference of the adapter. The adapter is pressed together for assembly and inserted into two openings of a U-shaped bracket of a wiper strip support. After being threaded in, the adapter reassumes its original form and with its circumference presses against the openings in the legs of the U-profile. A spring clip, which is arranged on the base surface of the U-profile and engages in the longitudinal slot, secures the adapter against twisting. Furthermore, it holds it in the axial direction by supporting itself on the lateral shoulders of the adapter. In a further assembly step, the pin fastened on the free end of the wiper arm can be put into the passage bore hole.

SUMMARY OF THE INVENTION

According to the invention, the wiper blade features a supporting bracket system with a center bracket that has an inset box, whose side walls are connected to one another via an articulated bolt and always feature at least one passage offset in the longitudinal direction to the articulated bolt. These types of wiper blades that are customary as such are used with wiper arms, which engage from above in the inset box with their hook-like end and encircle the articulated bolt with the use of an adapter or engage with two locking pins in two opposing passages.

According to the invention, a plastic adapter with a block-shaped center part is inserted from above into the inset box, which center part is adjacent with lateral guide surfaces to the insides of the side walls of the insert box. From a covering wall of the adapter, collars project laterally beyond the side walls, whereby the collars form guide surfaces in the area of the bridge to which a bearing surface of the wiper arm and the bent end of the bridge are adjacent in an assembled state. The collars form bearing eyes in the area of at least two opposing passages, which are arranged externally on the inset box and are separated from the center part by slots that run longitudinally. The slots are coordinated with the strength of the side walls. The center part features a rest bore hole matching the bearing eyes. In an assembled state the adapter is held on the articulated bolt via a clip in the center part by means of locking noses.

Using the adapter in accordance with the invention, a wiper arm, whose free end is provided with a transverse pin for a sidelock system, can also be used for a wiper blade with a supporting bracket system. With respect to wind noise and flow resistance, the advantages that are connected with the flat, low construction of the sidelock system can be achieved with simple means also in the case of wiper blades with a supporting bracket system. In doing so, the shape and dimensions of the wiper arm and the wiper blade are advantageously retained so that no structural modifications or new tools are required to fabricate the components. In addition, the parts of the wiper arm and the wiper blade, which are normally fabricated of metal, namely sheet steel, can be isolated from one another by the adapter made of plastic so that movement noise and wear are minimized. To do so, the bearing eyes, the rest bore hole and the pin are expediently coordinated in terms of their diameters and their positions to the passages and the clip in such a way that when the windshield wiper is in operation there is no contact between the pin and the wiper blade. In addition, as a rule plastic has good sliding properties for the placement of the pin.

BRIEF DESCRIPTION OF THE DRAWINGS

Additional advantages are yielded from the following description of the drawings. An exemplary embodiment of the invention is depicted in the drawings. The drawings, the description and the claims contain numerous features in combination. The expert will also observe individual features expediently and combine them into additional, meaningful combinations.

The drawings show.

DESCRIPTION OF THE EXEMPLARY EMBODIMENT

Figure 1:
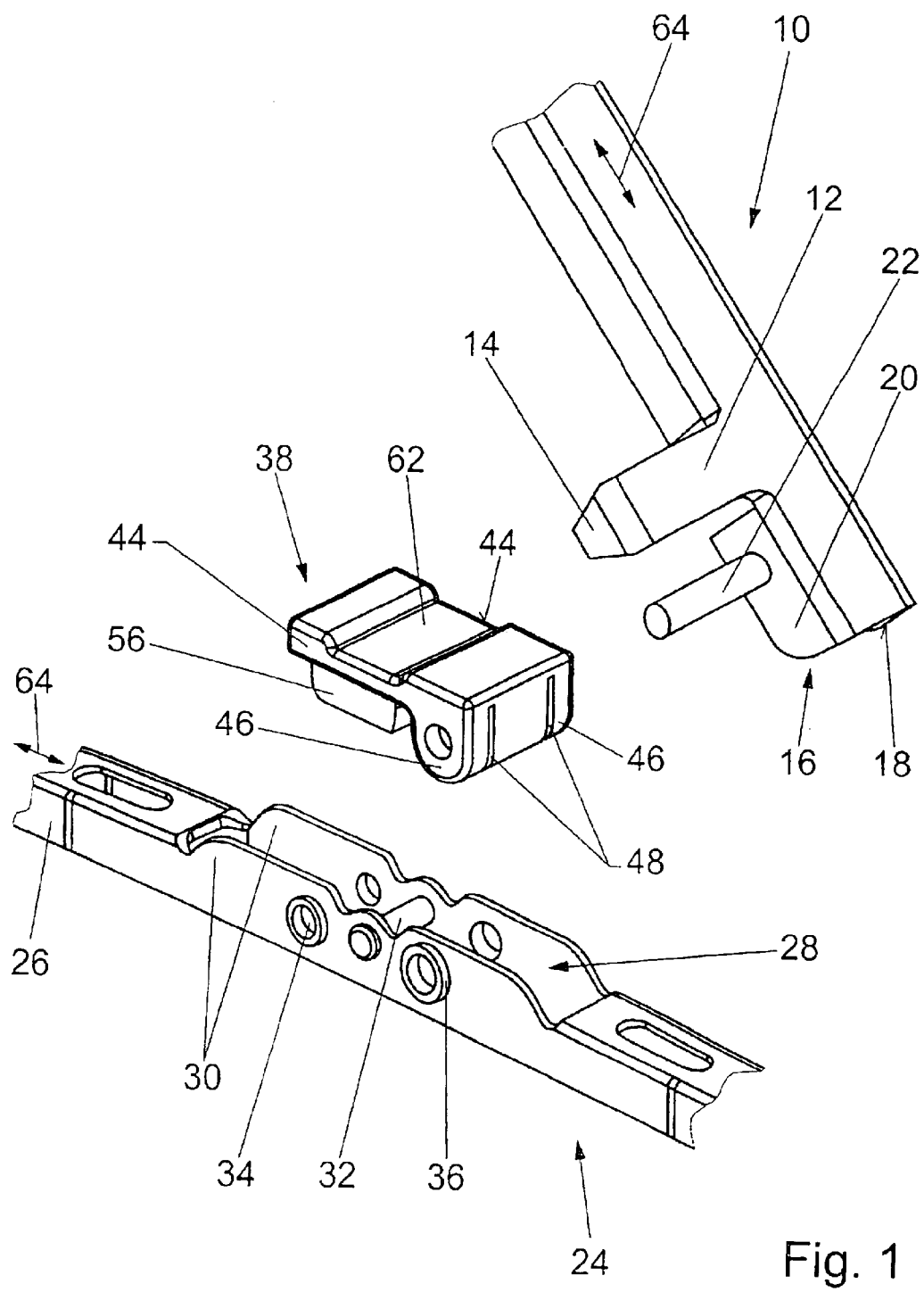
FIG. 1 An exploded depiction of an articulated connection between a wiper arm and a wiper blade, FIG. 2A perspective view of an adapter from above and FIG. 3A perspective view of an adapter from below.
Figure 2:
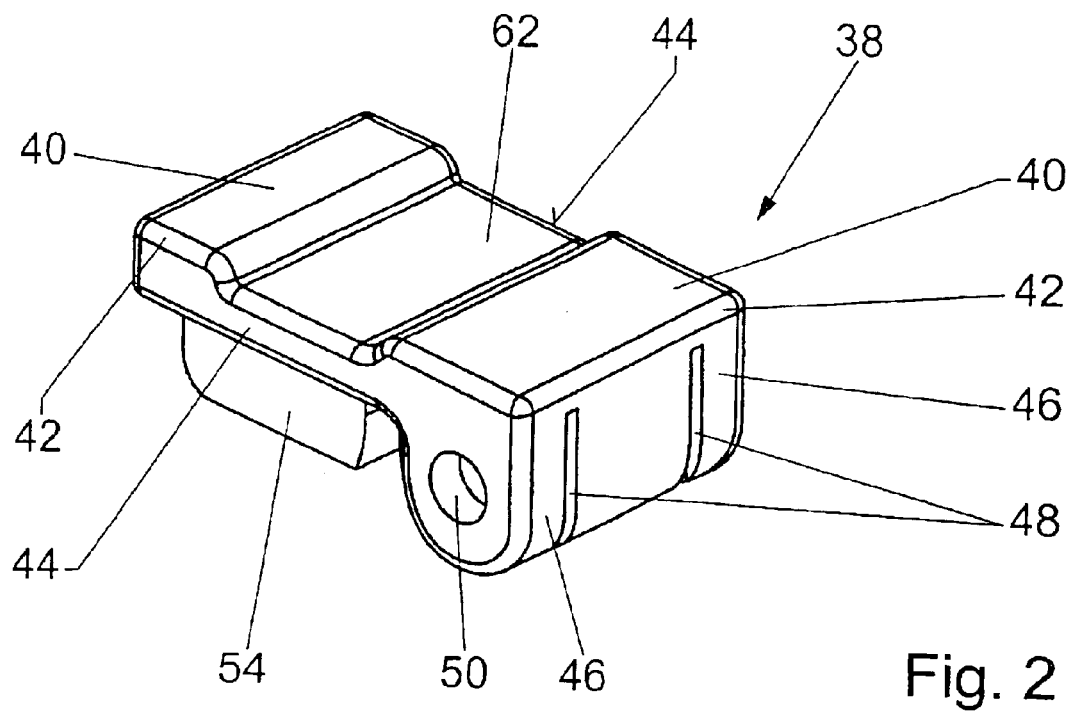
Figure 3:
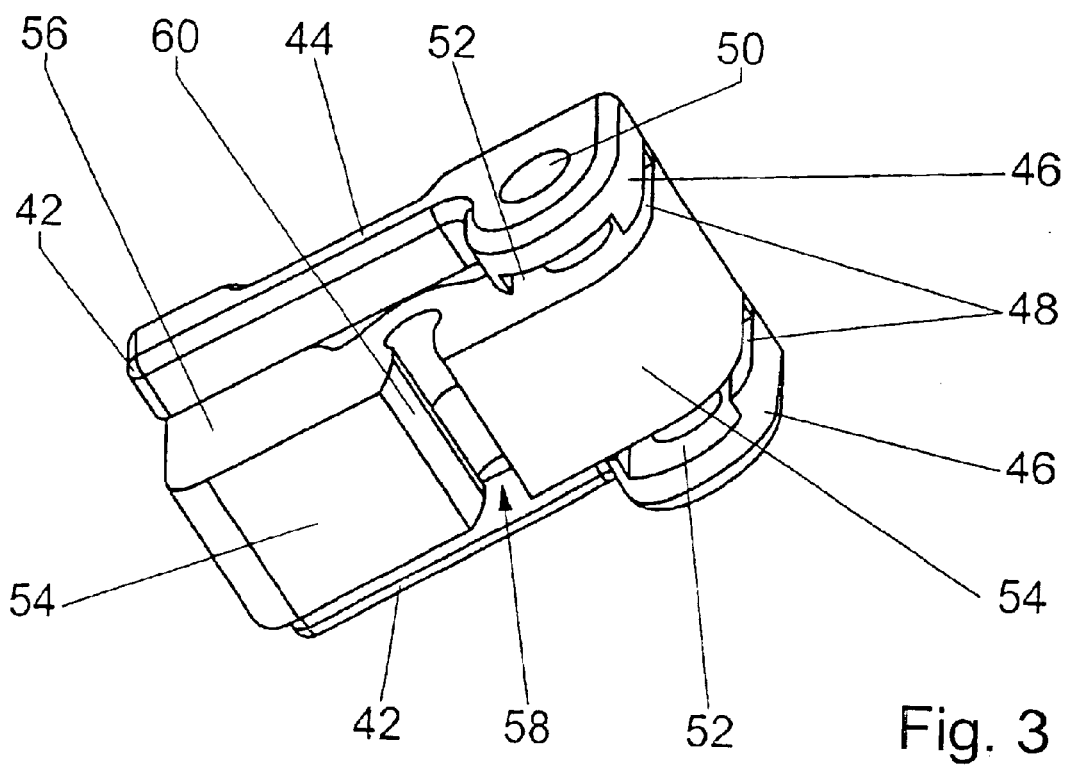

Of a windshield wiper, just the parts of a wiper arm 10 and a wiper blade 24 (FIG. 1) that are required to understand the invention are depicted. The wiper arm 10 has a U-shaped profile 16, on whose legs 18 a pin 22 is fastened laterally, transverse to the longitudinal direction 64 and pointing to the wiper blade 24, so that the wiper blade 24 can be assembled according to the sidelock system and a low construction height of the windshield wiper can be achieved. In addition, a bridge 12 is formed on the free end of the wiper arm 10, which bridge is arranged parallel to the pin 22 and offset in the longitudinal direction 64 relative to this pin and features a bent end 14. The wiper blade 24 has a supporting bracket system, of which a center bracket 26 is depicted, which has an inset box 28, whose side walls 30 are connected to one another via an articulated bolt 32. In addition, two opposing passages 34 are each arranged on both sides of the articulated bolt 32 offset in the longitudinal direction 64 in the side walls 30.

The wiper blade 24 is connected to the wiper arm 10 with the aid of an adapter 38. The adapter 38 is comprised essentially of a block-shaped center part 54 with lateral guide surfaces 56 and a covering wall 40 with laterally formed collars 42, which are separated from the center part 54 by slots 48. In an assembled state, the side walls 30 of the inset box 28 engage in the slots 48, whereby the center part 54 supports itself inside on the side walls 30 of the inset box 28. The center part 54 features a transverse clip 58, which in an assembled state encircles the articulated bolt 32 of the wiper blade 24 with locking noses 60 and thus fixes the adapter 38 in the inset box 28. Moreover, the center part 54 features a rest bore hole 50 for the pin 22, which in an assembled state aligns with the passages 34, but is kept slightly smaller in terms of diameter than the passages 34 so that metal contact between the pin 22 and the passages 34 is avoided.

The collars 42 form bearing eyes 46 in the area of the rest bore hole 50. The rest bore hole 50 is extended by the bearing eyes 46. The collars 42 feature guide surfaces 44 on their outsides, which in an assembled state are adjacent on the one side to a bearing surface 20 of the wiper arm 10 and on the other side to the bent end 14 of the bridge 12. Toward the slot 48, the bearing eyes 46 also have recesses 52 for edges 36, which as a rule are formed externally on the passages 34.

During assembly, the adapter 38 is first inserted into the inset box 28 of the wiper blade 24 and rotated together with the wiper blade 24 around the rotational axis of the wiper blade 24 perpendicular to the longitudinal direction 64 of the wiper arm 10 so that the pin 22 can be slid into the rest bore hole 50 of the adapter 38. Afterwards, the wiper blade 24 is rotated back into its operating position where the wiper blade 24 runs approximately parallel to the wiper arm 10. In this process, the bridge 12 grips over the wiper blade 24, whereby its bent end 14 axially locks the wiper blade 24 by being adjacent to the allocated guide surface 44 of the adapter 38. At the same time, the bridge 12 dips into a corresponding depression 62 of the covering wall 40 of the adapter 38.

The depth of the depression 62 is coordinated with the material strength of the bridge 12 in such a way that the outer surface of the bridge 12 ends approximately flush with the adjacent surface of the covering wall 40.

What is claimed is:

1. Windshield wiper with a wiper arm (10) on whose free end a pin (22) is fastened laterally, transverse to the longitudinal direction (64) and pointing to a wiper blade (24) for the articulated connection of the wiper blade (24), which pin is inserted into a passage opening of the wiper blade (24) and in an assembled position is locked axially via a bridge (12) that is arranged parallel to the pin (22) on the wiper arm (10) and grips over the wiper blade (24) with a bent end (14), characterized in that the wiper blade (24) features a supporting bracket system with a center bracket (26) that has an inset box (28), whose side walls (30) are connected to one another via an articulated bolt (32) and always feature at least one passage (34) offset in the longitudinal direction (64) to the articulated bolt (32), in that a plastic adapter (38) with a block-shaped center part (54) is inserted from above into the inset box (28), which center part is adjacent with lateral guide surfaces (56) to the insides of the side walls (30) and from whose covering wall (40) collars (42) project laterally beyond the side walls (30) forming guide surfaces (44) in the area of the bridge (12) to which a bearing surface (20) of the wiper arm (10) and the bent end (14) of the bridge (12) are adjacent in an assembled state, and in that the collars (42) form bearing eyes (46) in the area of at least two opposing passages (34), which bearing eyes are arranged externally on the inset box (28) and are separated by slots (48) from the center part (54), which features a rest bore hole (50) matching the bearing eyes (46), whereby in an assembled state the adapter (38) is held on the articulated bolt (32) via a clip (58) in the center part (54) by means of locking noses (60).

2. Windshield wiper according to claim 1, characterized in that the covering wall (40) of the adapter (38) features a depression (62) that runs crosswise in the area of the bridge (12) whose depth is adapted to the material strength of the bridge (12).

3. Windshield wiper according to claim 1, characterized in that the passages (34) have outward pointing edges (36) and the bearing eyes (46) have corresponding recesses (52) on their insides.

4. Windshield wiper according to claim 1, characterized in that the bearing eyes (46), the rest bore hole (50) and the pin (22) are coordinated in terms of their diameters and their positions to the passages (34) and the clip (58) in such a way that when the windshield wiper is in operation there is no contact between the pin (22) and the wiper blade (24).

* * * * *